B. BURR.
Wheel Hub.
No. 100,973. Patented March 22, 1870.
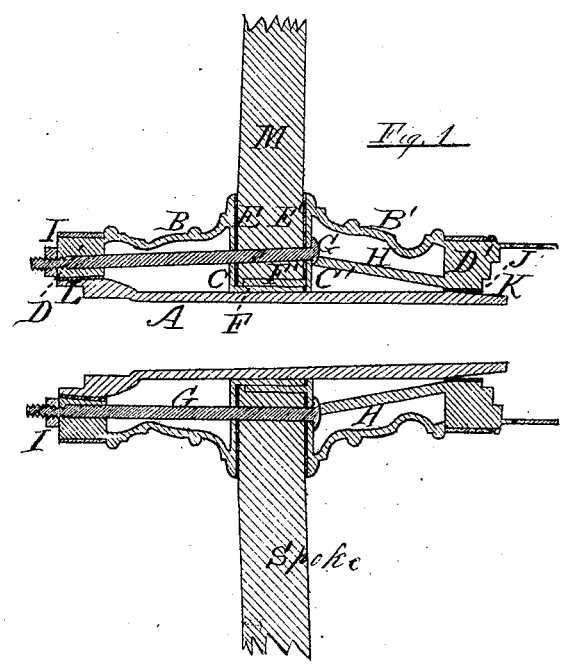
Witnesses.
C. W. Porter
P. H. Buck
Inventor
Bradley Burr,
By his attorney,
G. L. Chapin,

United States Patent Office.

BRADLEY BURR, OF BATAVIA, ILLINOIS.

Letters Patent No. 100,973, dated March 22, 1870.

IMPROVEMENT IN CARRIAGE-WHEEL HUBS.

The Schedule referred to in these Letters Patent and making part of the same.

*To all whom it may concern:*

Be it known that I, BRADLEY BURR, of Batavia, in the county of Kane and State of Illinois, have invented an Improvement in Carriage-Wheels; and I do hereby declare that the following is a full, clear, and exact description thereof, which will enable those skilled in the art to make and use the same, reference being had to the accompanying drawings and letters marked thereon making a part of this specification, in which—

Figure 1 is a longitudinal central sectional elevation.

The nature of the present invention consists in making each part of a two-part hub in the form of a shell, having annular flanges, which hold the spokes in place by means of bolts put through the flanges and spokes, and fastening to the base of the hub by means of nuts, and in placing the said fastening-bolts so as to form a truss in relation to braces cast in the outer half of hub; and, further, in providing the hub with overlapping thimbles, to strengthen its center, in combination with packing, for giving the pipe-box a yielding bearing, as the whole is hereinafter fully described.

B represents the base end, and B' the outer end of the two-part hub, each part of which is cast in the form of a shell, and provided with annular rings at their respective ends, and with flanges, C C', at their middle parts.

The flanges C C' have annular forms, and are used to clamp the spokes M in place in the usual manner; and the flange C' belonging to the part B' supports an internal thimble, F', and the flange C supports a thimble, F.

These thimbles envelop each other, and form a strong center for the hub, and prevent it from working on the spokes, or otherwise getting out of place, the ends of said thimbles not coming so nearly together as to prevent the flanges supporting them from being closely clamped to the spokes in case the latter should shrink.

The clamping is done by means of two or more bolts, G, whose heads bear against the flange C' of that part of the head shown at B, pass through the spokes, and fasten to the annular ring D by means of nuts I.

The outer ends of the bolts G incline toward the larger end of box A, and thus form a truss, in combination with stays or braces H, cast solid to the ring D' and flange C' of that part of the hub shown at B'.

By this means, a cast-metal hub is made very light and strong, while, at the same time, the spokes can be clamped closely enough to hold them firmly in place. If, however, the spokes M are to have an unusual pressure, the parts B B' can be forced together by any sufficient power, and the nuts I on the ends of bolts G afterward turned tight.

The pipe-box A is tapered on its periphery at both ends, and between it and the rings D D' are placed elastic packings L, so that, when the two-part hub B B' is clamped together, the said box will be held firmly in place, as clearly shown in the drawing.

E represents elastic packing placed between the flanges C C' and the spokes, to give the latter an easy bearing.

Having thus described my invention,

What I claim, and desire to secure by Letters Patent of the United States, is—

1. The two-part shell hub B B', provided with rings D D', held together by inclined bolts G, and strengthened by braces H, as set forth.

2. The two-part hub B B', provided with rings D D', bolts G, braces H, flanges C C', overlapping thimbles F F', as described.

BRADLEY BURR.

Witnesses:
C. W. PORTER,
F. H. BUCK.